Jan. 30, 1968    G. KORINEK ET AL    3,366,556
PROCESS FOR THE MANUFACTURE OF DRY ELECTROLYTIC CONDENSERS
Filed June 12, 1964
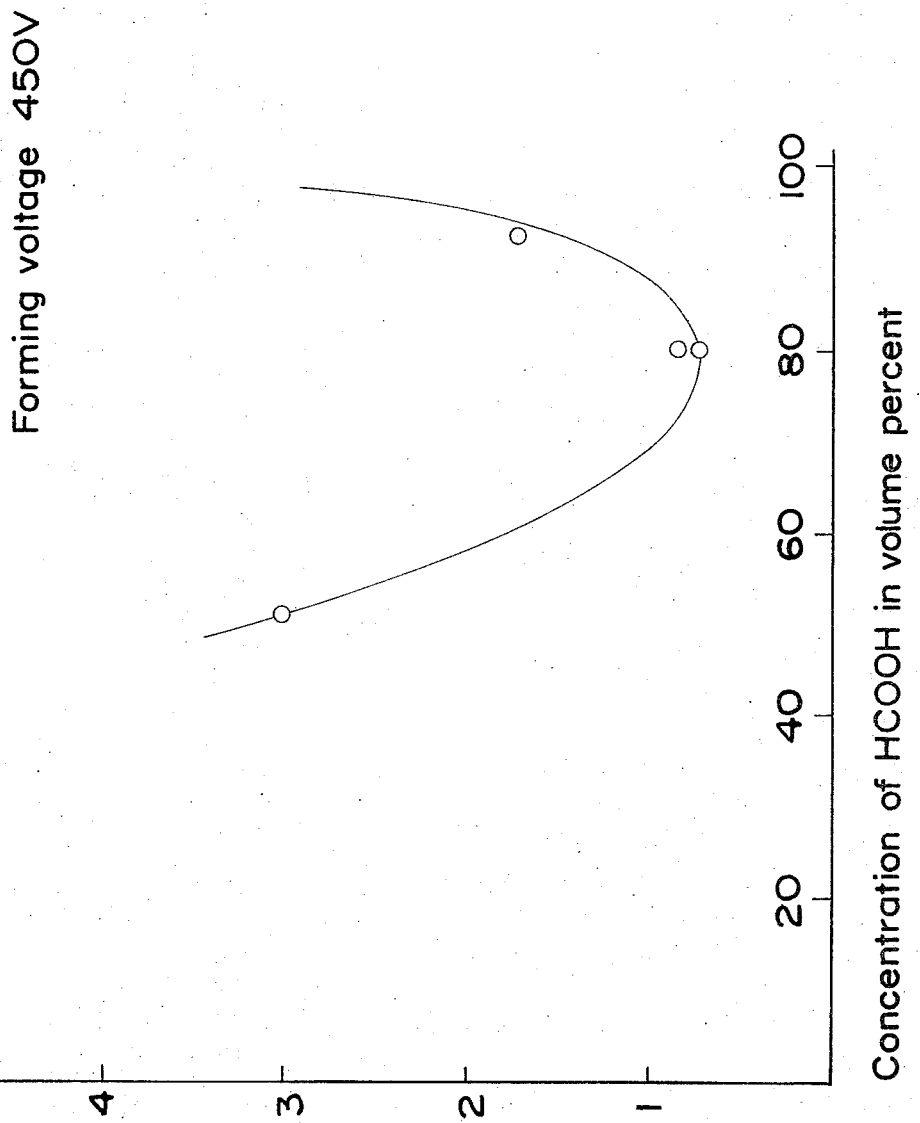
George Korinek
and
Kurt Huber
INVENTORS
BY Bryant W. Brennan
ATTORNEYS

United States Patent Office 3,366,556
Patented Jan. 30, 1968

3,366,556
PROCESS FOR THE MANUFACTURE OF DRY ELECTROLYTIC CONDENSERS
George Korinek, Riehen, and Kurt Huber, Ittigen, Bern, Switzerland, assignors to Ciba Limited, Basel, Switzerland, a Swiss company
Filed June 12, 1964, Ser. No. 375,400
Claims priority, application Switzerland, June 24, 1963, 7,793/63
4 Claims. (Cl. 204—38)

ABSTRACT OF THE DISCLOSURE

An improved process is provided for manufacturing dry electrolytic condensers in which a sintered body of a pulverized valve metal such as tantalum or niobium is anodized by using the sintered body as the anode and employing concentrated formic, acetic or propionic acid as the electrolyte. The sintered body is thereafter treated so as to provide one or more layers of semi-conductor metal oxide about the body and then reanodized. Thereafter, a conductor coating is applied over the semi-conductor metal oxide.

---

The manufacture of dry electrolytic condensers is known. For this purpose there are used sintered bodies from so-called valve metals which in conjunction with a grown-on oxide layer display rectifier properties. The best known valve metals are titanium, zirconium and especially tantalum and niobium.

The sintered body is manufactured, for example, by pressing the metal powder round a metal wire and sintering this pressed wire under a high vacuum at a temperature ranging from about 1800 to 2300° C. The resulting sintered bodies are then subjected in a first process step to an anodic oxidation to form a dielectric oxide layer on the inner and outer surface of the porous sintered body. This anodic oxidation is achieved by immersing the sintered body in an electrolyte, the sintered body being used as the positive electrode. The properties of the dielectric film thus formed depend substantially on the composition of the electrolyte as well as on the temperature, the current density, the voltage and the time. This treatment of a sintered body in the first process step is also referred to as "preforming." Following upon the preforming the sintered body is freed from any adherent electrolyte, either by repeated washing, boiling or evaporation at an elevated temperature. In the second stage of the process one or several layers of a solid, semiconductor metal oxide, for example manganese dioxide, nickel oxide or copper oxide is/are applied. These layers are capable of splitting off oxygen whereby any possible damage to the dielectric oxide skin may be made good. For this purpose, the preformed sintered body is impregnated with an aqueous solution of a salt manganese, nickel or copper, and this is followed by pyrolysis at 200 to 500° C. to give rise to the semiconductor metal oxide. The impregnation and the following pyrolysis may be performed several times. After having produced the semiconductor metal oxide layer the sintered anode is subjected to a further anodic treatment in a third stage of the process. In this operation, the so-called after-forming, the porous sintered body is immersed in an electrolyte; also in this operation it acts as the anode. The anodic after-treatment considerably reduces the leakage current of the finished condenser since any defects in the under-lying dielectric coating are repaired. The type and composition of the electrolyte chosen is in this case, too, of decisive importance. The electrolyte used for after-forming need not necessarily be the same as used for pre-forming. In the after-forming operation the sintered body carries a semi-conductor layer which determines the choice of electrolyte to be used in after-forming. Following upon the anodic after-treatment the sintered anode is once more freed from any electrolyte lodged in the interspaces and pores by washing, boiling or heating. Following upon this, any desired further layers of the semiconductor metal oxide may be applied. Finally, the sintered body is provided with a conductor coating on top the whole semiconductor layer, for example a coating of graphite. A metal electrode is then attached to the conductor layer and this completes the manufacture of the dry electrolytic condenser.

A wide variety of compounds have been proposed for use as electrolyte in the preforming operation. In the case of aqueous electrolytes, chromic acid, oxalic acid and especially sulphuric or phosphoric acid have been proposed, using temperatures within the range from 50 to 150° C. As electrolyte for the after-forming of sintered anodes there have been proposed, for instance, nitric and acetic acid, but in this connection it has been expressly stated that acetic acid is not suitable for preforming tantalum electrodes. It has now been found that, contrary to this statement, particularly valuable sintered anodes can be made by carrying out the preforming in a concentrated solution of formic, acetic or propionic acid.

The present invention provides a process for the manufacture of a dry electrolytic condenser, wherein in a first stage a dielectric oxide layer is produced by anodic oxidation on a sintered body of tantalum or niobium; in a second stage the sintered body is impregnated (if desired repeatedly) with a metal salt which latter is then converted by pyrolysis into a semiconductor oxide, whereupon in a third stage the sintered body is once more subjected to an anodic treatment and then coated with a layer of a conductor material, characterised by the fact that the anodic oxidation of the sintered body in the first stage is performed in a concentrated aqueous solution of formic, acetic or propionic acid.

Advantages to be derived from the present process include the possibility of achieving higher voltages and reduced leakage currents. The preferred temperature range of the electrolyte for preforming is 0 to 80° C. The current density ranges advantageously from 20 to 100, preferably from 30 to 50, milliamperes per gram of sintered anode.

It has further been found that the concentration of the bath is of importance. Dilute solutions of formic, acetic or propionic acid are unsuitable. Best results are obtained at concentrations from 70 to 90 percent, preferably from 75 to 85, percent by volume. The accompanying drawing shows that, when forming is carried out in formic acid to 450 v., the least leakage currents are measured at a concentration of 80 percent by volume. The table of the example lists the results obtained as a function of the type and concentration of the electrolyte. Experiments 1 to 4 show the good reproducibility of the measured residual current for 80% formic acid. Experiments 5 and 6 demonstrate the rise of the residual current as the concentration decreases or respectively increases. In Experiments 7 and 8 formic acid of 80% strength has been used; in these cases the residual current gives particularly low measurements. In Experiment 9 propionic acid has been used. Experiments 10, 11 and 12 concern acids that closely resemble formic, acetic and propionic acid, namely oxalic, trichloracetic and dichloracetic acid. As these results reveal, these electrolytes produce very high leakage currents.

Example 10 cylindrical tantalum sintered anodes with pressed-in wires, having an average weight of 0.3 g., a length of 5 mm. and a diameter of 3 mm., are welded on to a piece of tantalum sheet and together immersed in the electrolyte. The tantalum holder with the sintered bodies attached to it is wired as anode. The cathode is constituted by a piece of tantalum sheet wrapped in annular fashion round the anode bodies.

Depending on the electrolyte and the current density, formation takes from 2 to 24 hours. When formic acid is used, the total formation time up to and at 450 v. ranges from about 8 to 10 hours, and with acetic acid as a rule longer. The results are summarised in the following table.

The formation in the different electrolytes was performed as shown in the table from which it will be seen that under these conditions the highest voltages and the weakest residual currents are obtained after completed forming in 80% acetic and 80% formic acid.

TABLE

| Experiment No. | Electrolyte | Current density per 0.3 g. sinter anode | Temp., °C. | Maximum voltage reached, volts | Residual current per 10 sinter anodes |
|---|---|---|---|---|---|
| 1 | HCOOH, 80% | 13 ma | 20 | 486 | 1 ma. |
| 2 | HCOOH, 80% | 13 ma | 20 | 450 | 0.8 ma. |
| 3 | HCOOH, 80% | 13 ma | 20 | 450 | 0.8 ma. |
| 4 | HCOOH, 80% | 13 ma | 20 | 450 | 0.9 ma. |
| 5 | HCOOH, 50% | 13 ma | 20 | 450 | 3 ma. |
| 6 | HCOOH, 90% | 13 ma | 20 | 450 | 1.8 ma. |
| 7 | $CH_3COOH$, 80% | 13 ma | 20 | 500 | 0.48 ma. |
| 8 | $CH_3COOH$, 80% | 13 ma | 20 | 450 | 0.2 ma. |
| 9 | $CH_3 \cdot CH_2COOH$, 80% | 13 ma., 200v.<br>6.5 ma., 500v. | 20 | 500 | 4.8 ma. |
| 10 | $(COOH)_2$, 80% | 17 ma | 20 | 240 | About 180 ma. |
| 11 | $CCl_3 \cdot COOH$, 80% | 17 ma | 70 | 280 | Too large to measure. |
| 12 | $CHCl_2 \cdot COOH$, 80% | 17 ma | 40 | 380 | About 200 ma. |

What is claimed is:

1. In an improved process for the manufacture of high voltage dry electrolytic condensers, wherein in a first stage a dielectric oxide layer is produced by anodic oxidation on a sintered body of a pulverized metal selected from the group consisting of tantalum and niobium, then in a second stage the sintered body is impregnated with a salt of a metal selected from the group consisting of manganese, nickel and copper followed by conversion of said salt by pyrolysis into a semiconductor oxide, then in a third stage the sintered body is once more subjected to anodic oxidation and then covered with a coating of a conductor material, the improvement which comprises performing the first stage by immersing the sintered body, which acts as the anode, in an electrolyte consisting essentially of an aqueous solution containing 70–90% by volume of an acid selected from the group consisting of formic, acetic and propionic acid and forming to a voltage of at least about 450 volts.

2. A process as claimed in claim 1 wherein the anodic oxidation in the first stage is performed at a current density from 20 to 100 milliamperes per gram of sintered body and at a temperature ranging from 0 to 80° C.

3. In an improved process for the manufacture of high voltage dry electrolytic condensers, wherein in a first stage a dielectric oxide layer is produced by anodic oxidation on a sintered body of pulverized tantalum, then in a second stage the sintered body is impregnated with a salt of a metal selected from the group consisting of manganese, nickel and copper followed by conversion of said salt by pyrolysis into a semiconductor oxide, then in a third stage the sintered body is once more subjected to anodic oxidation and then covered with a coating of a conductor material, the improvement which comprises performing the first stage by immersing the sintered body, which acts as the anode, in an electrolyte consisting essentially of an aqueous solution containing 70–90% by volume of an acid selected from the group consisting of formic, acetic and propionic acid and forming to a voltage of at least about 450 volts.

4. A process as claimed in claim 3 wherein the anodic oxidation in the first stage is performed at a current density from 20 to 100 milliamperes per gram of sintered body and at a temperature ranging from 0 to 80° C.

References Cited
UNITED STATES PATENTS

| | | | |
|---|---|---|---|
| 2,930,951 | 3/1960 | Burger et al. | 317—242 |
| 2,989,447 | 6/1961 | Power | 204—42 |
| 3,120,695 | 2/1964 | Burnham | 29—25.31 |

HOWARD S. WILLIAMS, *Primary Examiner.*

JOHN H. MACK, *Examiner.*

W. VAN SISE, *Assistant Examiner.*